(12) United States Patent
Seo (10) Patent No.: US 9,763,278 B2
(45) Date of Patent: Sep. 12, 2017

(54) APPARATUS AND METHOD FOR PERFORMING DEVICE-TO-DEVICE COMMUNICATION IN WIRELESS COMMUNICATION SYSTEM

(71) Applicant: LG ELECTRONICS INC., Seoul (KR)

(72) Inventor: Inkwon Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 59 days.

(21) Appl. No.: 14/651,594

(22) PCT Filed: Dec. 13, 2013

(86) PCT No.: PCT/KR2013/011612
§ 371 (c)(1),
(2) Date: Jun. 11, 2015

(87) PCT Pub. No.: WO2014/104627
PCT Pub. Date: Jul. 3, 2014

(65) Prior Publication Data
US 2015/0334757 A1  Nov. 19, 2015

Related U.S. Application Data

(60) Provisional application No. 61/747,362, filed on Dec. 30, 2012, provisional application No. 61/889,540, filed on Oct. 11, 2013.

(51) Int. Cl.
*H04W 76/02* (2009.01)
*H04W 24/08* (2009.01)
(Continued)

(52) U.S. Cl.
CPC ......... *H04W 76/023* (2013.01); *H04W 24/08* (2013.01); *H04W 76/027* (2013.01);
(Continued)

(58) Field of Classification Search
None
See application file for complete search history.

(56) References Cited

U.S. PATENT DOCUMENTS 9,014,062 B2 * 4/2015 Ahn ...................... H04L 1/0003
370/280
2011/0026917 A1 * 2/2011 Li ........................ H04W 76/028
398/1
(Continued)

FOREIGN PATENT DOCUMENTS

WO  WO 2011/088886 A1  7/2011
WO  WO 2012/016378 A1  2/2012
(Continued)

*Primary Examiner* — Ayaz Sheikh
*Assistant Examiner* — Faiyazkhan Ghafoerkhan
(74) *Attorney, Agent, or Firm* — Birch, Stewart, Kolasch & Birch, LLP (57) ABSTRACT

According to one embodiment of the present invention, a method for performing device-to-device (D2D) communication is a method for performing, by a first device, D2D communication in a wireless communication system, including the steps of: performing D2D link monitoring (DLM); when the DLM result meets a predetermined condition, transmitting a D2D link failure (DLF) declaration to a third device; and performing communication with a second device in a fourth device determined by the third device.

14 Claims, 9 Drawing Sheets

(51) Int. Cl.
*H04W 92/18* (2009.01)
*H04W 4/00* (2009.01)
*H04W 88/04* (2009.01)

(52) U.S. Cl.
CPC ............ *H04W 4/005* (2013.01); *H04W 88/04* (2013.01); *H04W 92/18* (2013.01)

(56) References Cited

U.S. PATENT DOCUMENTS

| | | | | |
|---|---|---|---|---|
| 2012/0163252 A1* | 6/2012 | Ahn | ...................... | H04L 1/0003 370/280 |
| 2012/0243431 A1* | 9/2012 | Chen | ................. | H04W 72/0406 370/252 |
| 2012/0281658 A1* | 11/2012 | Rikkinen | .............. | H04W 88/04 370/329 |
| 2013/0083779 A1* | 4/2013 | Ahn | ...................... | H04W 72/04 370/336 |
| 2013/0223356 A1* | 8/2013 | Khoshnevis | ........ | H04W 72/042 370/329 |
| 2013/0288668 A1* | 10/2013 | Pragada | ................ | H04W 12/06 455/426.1 |
| 2013/0308598 A1* | 11/2013 | Madan | .................. | H04W 36/18 370/331 |
| 2013/0322388 A1 | 12/2013 | Ahn et al. | | |
| 2013/0324114 A1* | 12/2013 | Raghothaman | ..... | H04W 76/023 455/426.1 |
| 2014/0003301 A1* | 1/2014 | Madan | ................ | H04W 72/042 370/280 |
| 2014/0064203 A1 | 3/2014 | Seo et al. | | |
| 2014/0128089 A1 | 5/2014 | Jang et al. | | |
| 2014/0171062 A1* | 6/2014 | Fallgren | ................ | H04W 40/22 455/422.1 |

FOREIGN PATENT DOCUMENTS

| | | |
|---|---|---|
| WO | WO 2012/091418 A2 | 7/2012 |
| WO | WO 2012/128505 A2 | 9/2012 |
| WO | WO 2012/173443 A2 | 12/2012 |

* cited by examiner

APPARATUS AND METHOD FOR PERFORMING DEVICE-TO-DEVICE COMMUNICATION IN WIRELESS COMMUNICATION SYSTEM

CROSS REFERENCE TO RELATED APPLICATIONS

This application is the National Phase of PCT International Application No. PCT/KR2013/011612, filed on Dec. 13, 2013, which claims priority under 35 U.S.C. 119(e) to U.S. Provisional Application No. 61/747,362, filed on Dec. 30, 2012 and 61/889,540 filed on Oct. 11, 2013, all of which are hereby expressly incorporated by reference into the present application.

FIELD OF THE INVENTION

The following description relates to a wireless communication system and, more particularly, to measurement and a communication method related to the same in Device-to-Device (D2D) communication.

BACKGROUND ART

The wireless communication system is being extensively developed in order to provide diverse types of communication devices, such as voice or data services, and so on. Generally, a wireless communication system corresponds to a multiple access system that can support communication with multiple users by sharing an available system source (bandwidth, transmission power, and so on). Examples of the multiple access system may include a CDMA (code division multiple access) system, a FDMA (frequency division multiple access) system, a TDMA (time division multiple access) system, an OFDMA (orthogonal frequency division multiple access) system, a SC-FDMA (single carrier frequency division multiple access) system, a MC-FDMA (multi carrier frequency division multiple access) system, and so on.

Device-to-Device (D2D) communication refers to a communication method that can directly send and receive voice, data, and so on, to and from user equipments without passing through a base station (evolved NodeB; eNB) by setting up a direct link between User Equipments (UEs). D2D communication may include methods, such as user equipment-to-user equipment (UE-to-UE) communication, Peer-to-Peer communication, and so on. Additionally, the D2D communication method may also be applied to M2M (Machine-to-Machine) communication, MTC (Machine Type Communication), and so on.

D2D communication is being considered as one of many solutions for resolving the load of the base station caused by the data traffic, which is increasing at a vast rate. For example, since data can be sent and received to and from user equipments without passing through the base station, unlike in a conventional (or legacy) wireless communication system, network overload may be reduced when using D2D communication.

DETAILED DESCRIPTION OF THE INVENTION

Technical Objects

In the present invention, a technical object is to provide a detailed method for performing communication when performing D2D link monitoring and declaring link failure.

The technical objects of the present invention will not be limited only to the objects described above. Accordingly, technical objects that have not been mentioned above or additional technical objects of the present application may become apparent to those having ordinary skill in the art from the description presented below.

Technical Solutions

A first technical aspect of the present invention corresponds to a method for performing device-to-device (D2D) communication, which is a method for performing, by a first device, D2D communication in a wireless communication system, including the steps of: performing D2D link monitoring (DLM); when the DLM result meets a predetermined condition, transmitting a D2D link failure (DLF) declaration to a third device; and performing communication with a second device via a fourth device determined by the third device.

The first technical aspect of the present invention may include the following features.

In case the first device corresponds to a transmitting end of the D2D link, the predetermined condition may correspond to one of consecutively receiving a predetermined number of negative acknowledgements (NACKs) and failing to consecutively receive a predetermined number of acknowledgements (ACKs).

The step of performing communication with a second device through the fourth device may include a step of transmitting a signal that is to be transmitted to the second device to the fourth device through a resource allocated by the third device.

In case the first device corresponds to a receiving end of the D2D link, the predetermined condition may correspond to a demodulation performance of the signal received through the D2D link being lower than a predetermined value.

The DLF may include information related to data corresponding to a last acknowledgement (ACK) transmitted by the second device.

The information related to data corresponding to a last acknowledgement (ACK) transmitted by the second device may include one or more of a transmission block number and an internet protocol packet sequence number.

The third device may correspond to one of a cluster user equipment and a base station, and the fourth device may correspond to a relay user equipment.

A second technical aspect of the present invention corresponds to a method for supporting device-to-device (D2D) communication, which is a method for supporting, by a third device, D2D communication in a wireless communication system, including the steps of: receiving a D2D Link Failure (DLF) declaration from a first device; and determining a fourth device that is to relay communication between the first device and a second device, wherein the DLF declaration is transmitted when a D2D Link Monitoring (DLM) result of the first device meets a predetermined condition.

The second technical aspect of the present invention may include the following features.

In case the first device corresponds to a transmitting end of the D2D link, the predetermined condition may correspond to one of consecutively receiving a predetermined number of negative acknowledgements (NACKs) and failing to consecutively receive a predetermined number of acknowledgements (ACKs).

The method may further include a step of having the first device allocate resources that is to be used when transmitting a signal to the second device through the fourth device.

In case the first device corresponds to a receiving end of the D2D link, the predetermined condition may correspond to a demodulation performance of the signal received through the D2D link being lower than a predetermined value.

The DLF may include information related to data corresponding to a last acknowledgement (ACK) transmitted by the second device.

The information related to data corresponding to a last acknowledgement (ACK) transmitted by the second device may include one or more of a transmission block number and an internet protocol packet sequence number.

The third device may correspond to one of a cluster user equipment and a base station, and the fourth device may correspond to a relay user equipment.

Effects of the Invention

According to the present invention, by defining D2D link measurement, link failure declaration, and the subsequent procedures, a stable D2D communication may be available.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are given to provide a further understanding of the present invention, illustrate diverse exemplary embodiments of the present invention and describe the principles of the present invention along with the detailed description.

MODE FOR CARRYING OUT THE PRESENT INVENTION

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Resource Structure/Channel

Figure 1:
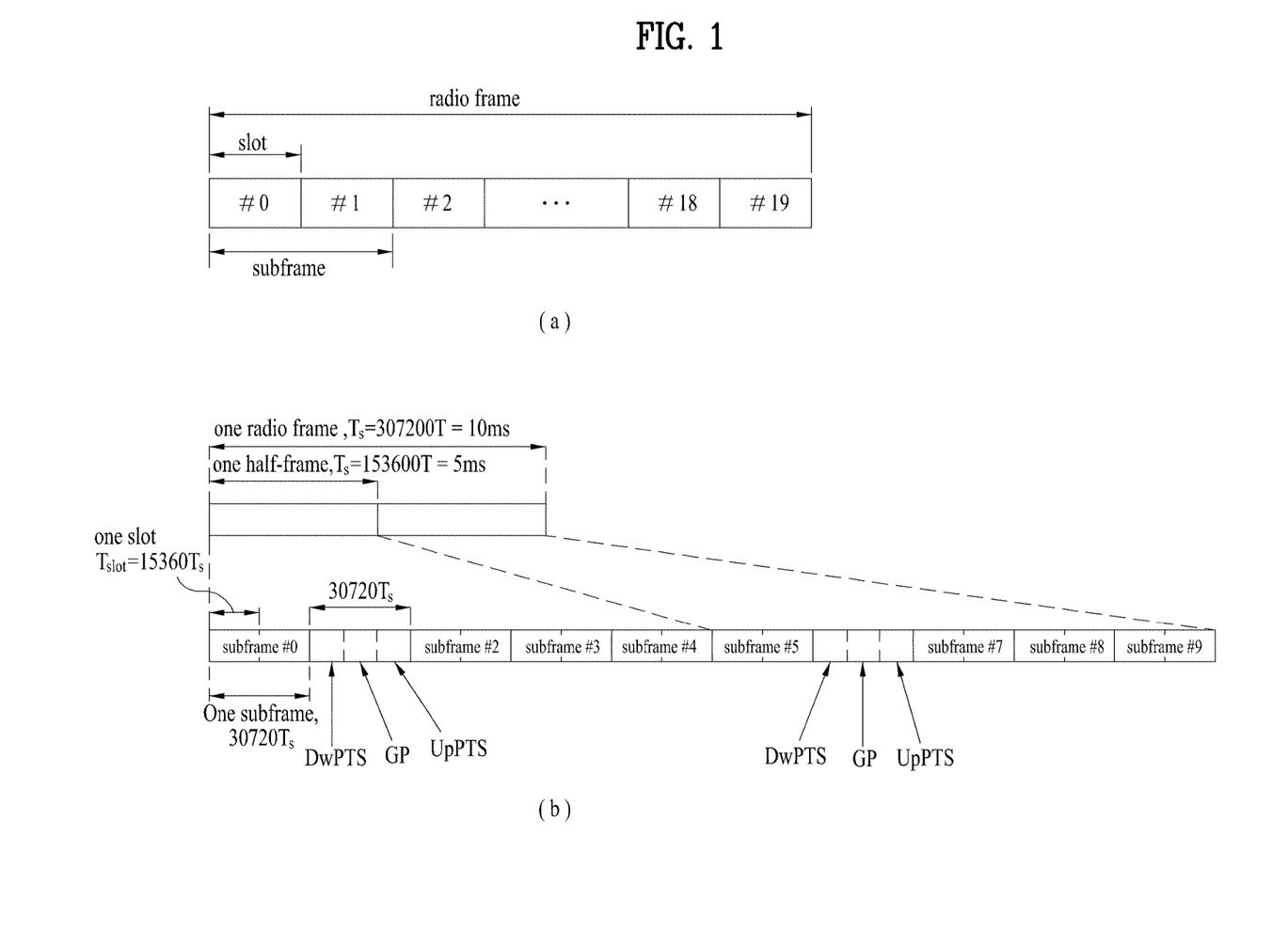
FIG. 1 illustrates a structure of a radio frame (or wireless frame).

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
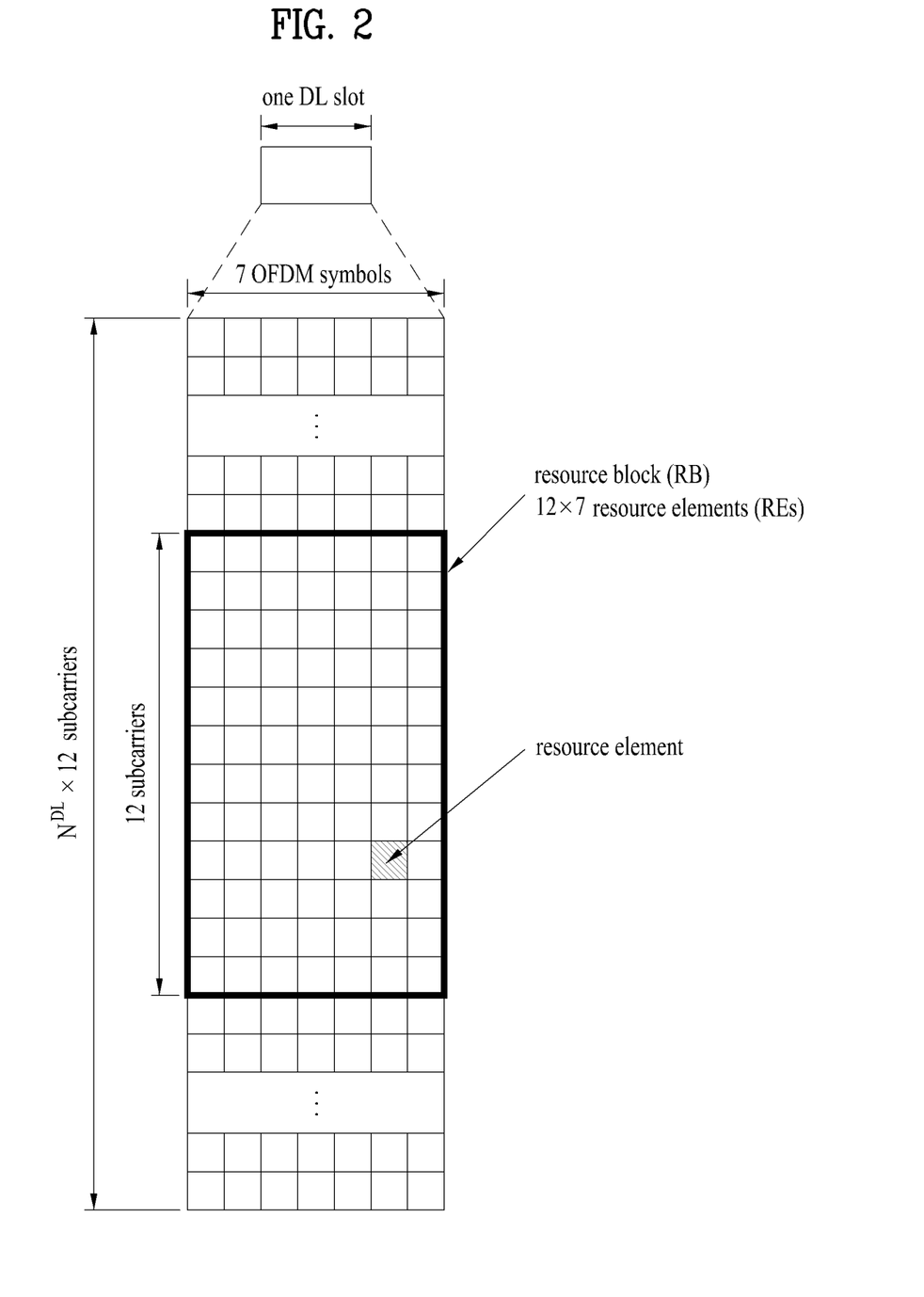
FIG. 2 illustrates a resource grid in a downlink slot.

FIG. 2 illustrates a resource grid in a downlink slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12 7 REs. The number $N_{DL}$ of RBs included in a DL slot depends on a DL transmission bandwidth. A UL slot may have the same structure as the DL slot.

Figure 3:
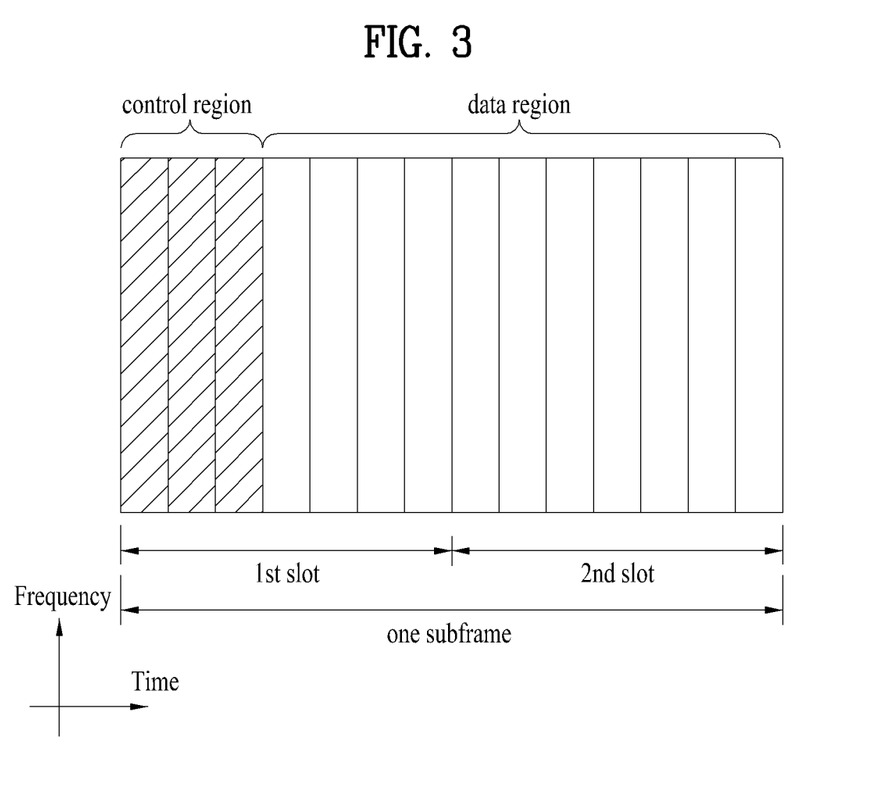
FIG. 3 illustrates a structure of a downlink subframe.

FIG. 3 illustrates a structure of a downlink subframe. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
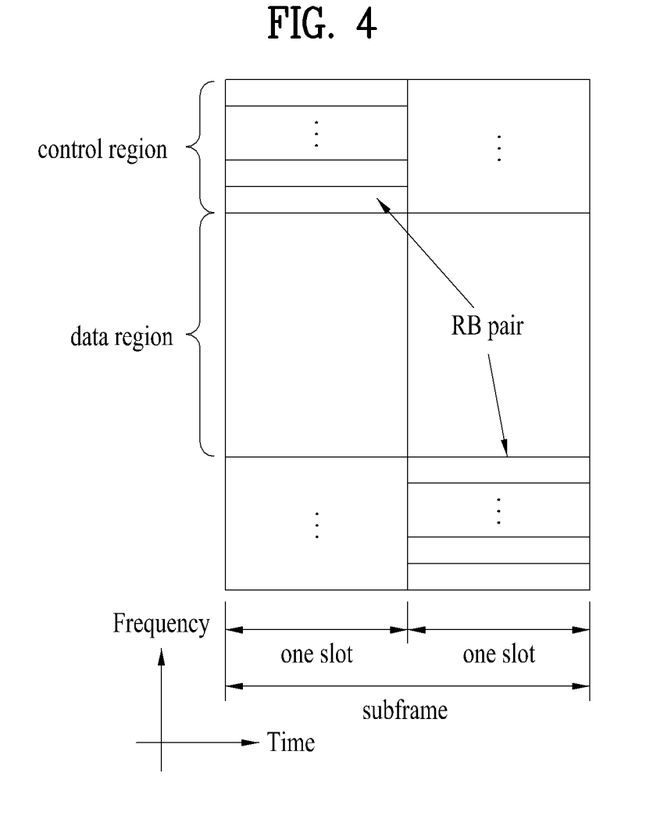
FIG. 4 illustrates a structure of an uplink subframe.

FIG. 4 illustrates a structure of an uplink subframe. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

Reference Signal (RS)

In a radio communication system, since packets are transmitted through a radio channel, a signal may be distorted during transmission. In order to enable a receiving end to correctly receive the distorted signal, the distortion of the received signal should be corrected by using channel information. In order to detect the channel information, a method of detecting channel information by transmitting a signal, which is known by both the transmitting end and the receiving end, and by using a level of distortion, which occurs when the signal is being received through a channel, is generally used. The signal is also referred to as a Pilot Signal or a Reference Signal (RS).

When transmitting and receiving data using multiple antennae, the channel status of each transmission antenna and each reception antenna should be known in order to correctly receive the signal. Accordingly, a separate reference signal should exist for each transmission antenna and, more specifically, for each antenna port.

The reference signal may be divided into an uplink reference signal and a downlink reference signal. In the current LTE system, uplink reference signals may include
  i) a DeModulation-Reference Signal (DM-RS) for performing channel estimation for a coherent demodulation of the information being transmitted through PUSCH and PUCCH
  ii) a Sounding Reference Signal (SRS) for allowing the base station to measure uplink channel quality at a frequency belonging to a different network.

Meanwhile, the downlink reference signal may include
  i) a Cell-specific Reference Signal (CRS), which is shared by all user equipments within the cell
  ii) a UE-specific Reference Signal designated only to a specific user equipment
  iii) a DeModulation-Reference Signal (DM-RS) for a coherent demodulation in case a PDSCH is being transmitted
  iv) a Channel State Information-Reference Signal (CSI-RS) for delivering Channel State Information (CSI) in case a downlink DMRS is being transmitted
  v) a MBSFN Reference Signal being transmitted for a coherent demodulation respective to a signal, which is being transmitted in a MBSFN (Multimedia Broadcast Single Frequency Network) mode
  vi) a Positioning Reference Signal being used for estimating geographical position information of the user equipment.

A reference signal may be broadly divided into two different types in accordance with its purpose. There is a reference signal having the purpose of channel information acquisition, and there is a reference signal for data demodulation. Since the former has the purpose of allowing the UE to acquire channel information transmitted via downlink, it shall be transmitted through a wideband, and even a UE that does not receive downlink data in a specific subframe is required to receive this reference signal. Additionally, this is also used in situations, such as a handover situation. The latter corresponds to a reference signal that is transmitted along with a resource respective to a downlink, when the base station transmits a downlink, and by receiving the corresponding reference signal the UE may demodulate data by performing channel measurement. This reference signal shall be transmitted to a region (or section) to which data are being transmitted.

The CRS is used for two different purposes, such as channel information acquisition and data demodulation, and a UE-specific reference signal is only used for the purpose of data demodulation. The CRS is transmitted at each subframe with respect to the wideband, and, depending upon the number of transmission antennae of the base station, reference signals may be transmitted with respect to a maximum of 4 antenna ports.

For example, in case the number of transmission antennae of the base station is equal to 2, CRSs respective to antenna ports No. 0 and No. 1 are transmitted, and, in case the number of transmission antennae is equal to 4, CRSs respective to antenna ports No. 0~No. 3 are transmitted.

Figure 5:
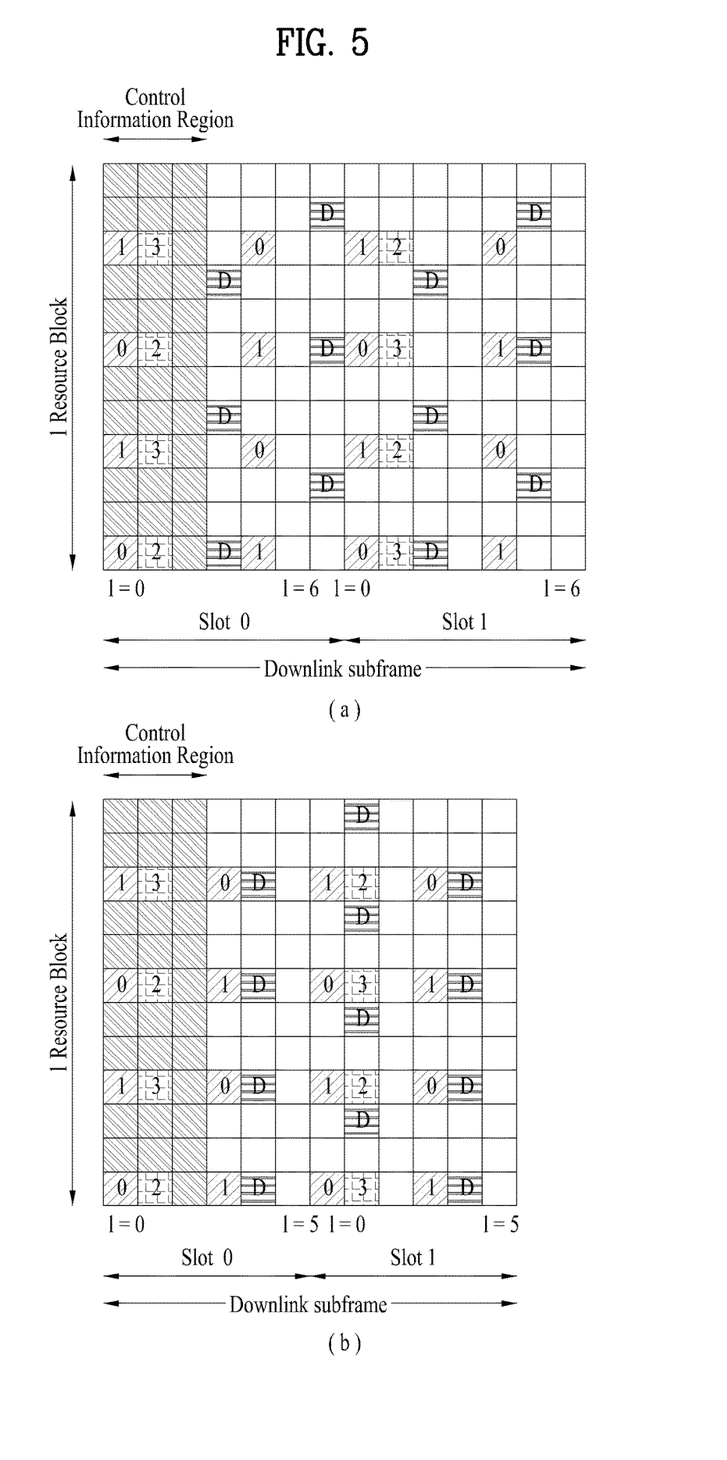
FIG. 5 illustrates a reference signal.

FIG. 5 illustrates a pattern according to which a CRS and a DRS, which are defined in the legacy 3GPP LTE system (e.g., Release-8), are mapped within a downlink resource block pair (RB pair). A downlink resource block pair, which corresponds to a unit to which a reference signal is mapped, may be expressed as one subframe in time×12 subcarriers in frequency. More specifically, in the time domain, one resource block pair has a length of 14 OFDM symbols, in case of a general CP (FIG. 5($a$)), and has a length of 12 OFDM symbols, in case of an extended CP (FIG. 5($b$)).

FIG. 5 illustrates a position of a reference signal within a resource block pair in a system, wherein the base station supports 4 transmission antennae. In FIG. 5, the resource elements (REs) that are marked as '0', '1', '2', and '3' respectively indicate each of the CRS positions corresponding to antenna port indexes 0, 1, 2, and 3. Meanwhile, in FIG. 5, the resource elements that is marked as 'D' indicates the position of a DMRS.

Measurement/Measurement Report

Measurement report is for one of several methods (handover, random access, cell search, and so on) for ensuring mobility of the user equipments or for the several methods. Since measurement report requires demodulation that is coherent to a certain level, with the exception for performing received signal strength indicator measurement, measurement report may be performed after the user equipment acquires synchronization and physical layer parameters. Measurement report corresponds to a concept including RRM measurement, such as Reference signal receive power (RSRP), Received signal strength indicator (RSSI), Reference signal received quality (RSRQ), and so on, which measure the signal strength of a serving cell and its neighboring cell or a signal strength to the total received power, and so on, and RLM measurement, which can evaluate whether or not radio link failure occurs by measuring a link quality with a serving cell.

In relation to RRM, RSRP is a linear average of power distribution of an RE to which a CRS is being transmitted via downlink. RSSI corresponds to a linear average of the total received power that is received by the corresponding user equipment, and, herein, the respective measurement target corresponds to an OFDM symbol including an RS for Antenna Port 0, and the measurement value includes interference and noise power from adjacent cells (or neighboring cells). In case higher-level layer signaling indicates a specific subframe for the RSRQ measurement, the RSSI is measured for all OFDM symbols included in the indicated subframe. RSRQ corresponds to a value that is measured in an N*RSRP/RSSI format, and, at this point, N corresponds to a number of RBs of the corresponding bandwidth when performing RSSI measurement.

The purpose of performing RLM is to allow a user equipment monitor the downlink quality of its serving cell, thereby allowing the user equipment to determine 'in-sync' or 'out-of-sync' with respect to the corresponding cell. At this point, RLM is based upon a CRS. The estimated downlink, which is estimated by the user equipment, is compared with an 'in-synch threshold (Qin)' and an 'out-of-synch threshold (Qout)'. Such threshold values may be expressed as a PDCCH BLER (Block Error Rate) of the serving cell, and, most particularly, Qout and Qin values respectively correspond to 10% BLER and 2% BLER. In fact, Qin and Qout respectively refer to values corresponding to the SINR of the received CRS, and, when the CRS-received SINR is greater than or equal to a predetermined level (Qin), the user equipment determines to be attached to the corresponding cell, and, in case the received SINR is less or equal to a predetermined level (Qout), the user equipment declares a RLF (Radio Link Failure).

As it can be understood by the above-described definition of RSRP, and so on, the basic premise of measurement report is that is it performed by using CRS. However, in case the cells share the same PCID, since the cells having the same PCID cannot be distinguished from the CRS, the RRM respective to each cell cannot be performed by using only the measurement report including RSRP/RSRQ based upon the CRS. Therefore, in case multiple cells have the same PCID, additional RSRP/RSRQ measurement report may be set to be performed based upon the CSI-RSs that are individually transmitted. When receiving the CSI-RS of a specific cell, in order to enhance reception accuracy, by preventing neighboring cells from performing signal transmission to an RE, to which the corresponding CSI-RS is being transmitted, a more accurate measurement may be performed despite the fact that the transmission rate of the CSI-RS is lower than that of the CRS. Therefore, even in case the cells have different PCIDs, accuracy in the RRM of the network may be enhanced by performing CRS-based RSRP/RSRQ measurement report and CSI-RS RSRP/RSRQ measurement report at the same time.

Another main purpose of CSI-RS transmission from each cell is for CSI feedback, which is performed by the user equipment in order to aid (or assist) the scheduling of the base station, which determines (or decides) rank, precoding matrix, MCS (Modulation and Coding Scheme or CQI), and so on, that are to be used when performing downlink data transmission between the corresponding cell and the user equipment. In the CoMP transmission method, the user equipment is required to feed-back CSI with respect to a downlink with a cooperative cell (or coordinated cell) in addition to that with the serving cell. Since the overhead is too high for the user equipment to feed-back the CSI respective to all cell cells included in a CoMP cluster to which the serving cell of the user equipment belongs, settings may be made for the UE to feed-back CSI respective to some of the cells included in the CoMP cluster that are worth being processed with coordinated scheduling and coordinated data transmission, i.e., a CoMP measurement set. The decision (or determination) of a CoMP measurement set respective to a specific user equipment may be configured by selecting cells having a RSRP of a predetermined level or higher, and, in order to do so, the user equipment performs RSRP measurement report on the cells included in the CoMP cluster to which the user equipment belongs. Alternatively, the base station may designate settings of the CSI-RSs, on which the user equipment intends to perform RSRP or RSRQ measurement report, to a CoMP management set and may notify such settings, and the user equipment may perform RSRP or RSRQ measurement with respect to the CSI-RSs that are transmitted from the cells belonging to the designated CoMP management set, and, in case the result meets a specific condition, the UE may perform reporting.

In addition to this, in order to allow ICIC to be established between CoMP clusters, among the cells of the neighboring CoMP cluster, in order to allow the network and user equipment to determine which cell causes the strongest interference to the corresponding user equipment, and to determine to which cell the corresponding user equipment causes the strongest uplink interference, the user equipment performs RSRP measurement and report on the cells included in the neighboring CoMP cluster.

In addition to the CRS-based RSRP/RSRQ measurement report for mobility management, such as handover of the user equipment, and so on, CSI-RS-based RSRP/RSRQ measurement report may also be performed for CoMP measurement set configuration and ICIC, thereby enhancing accuracy and flexibility of the RRM of the network.

Figure 6:
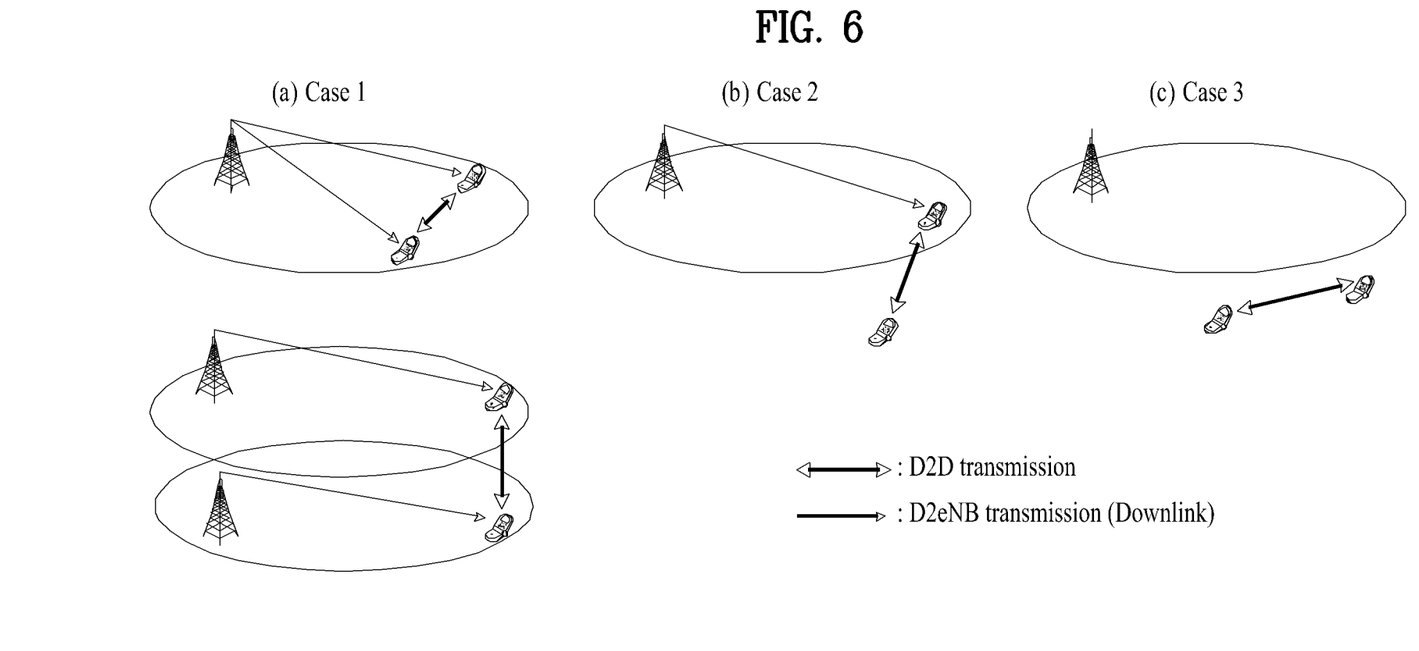
FIG. 6 illustrates a D2D communication system to which the exemplary embodiment of the present invention can be applied.

Meanwhile, even in case of D2D communication, the above-described measurement and measurement report may be performed, and, in accordance with the D2D link situation, Link failure may be declared. Accordingly, measurement/measurement report, link failure declaration in D2D communication proposed in the present invention will hereinafter be described. Additionally, in case a link failure occurs, methods for the continuity in the communication between the devices that were performing D2D link will also be described. In the following description, D2D link may refer to one of the cases illustrated in FIG. 6. More specifically, D2D link may correspond to any one of the case shown in FIG. 6(a), wherein all of the devices performing D2D communication are within the coverage of the base station/network, the case shown in FIG. 6(b), wherein one of the devices performing D2D communication is within the coverage of the base station/network, and the case shown in FIG. 6(c), wherein all of the devices performing D2D communication are outside of the coverage of the base station/network. Hereinafter, as shown in FIGS. 6(b) and (c), when a device performing D2D communication outside of the coverage of the base station/network transmits a specific signal, and so on, to the base station/network, this may indicate that the transmission is performed to a cluster UE (herein, the cluster UE may be interpreted as the UE performing resource allocation and management of a D2D cluster (a group of neighboring UEs available for D2D) (which is configured outside of (or inside of) the network coverage, and the cluster UE may also be referred to as a cluster header UE, a cluster master UE, and so on).

DLM (D2D Link Monitoring)/DLF (D2D Link Failure)

Basically, DLM may be performed by a device belonging to a network coverage, and, depending upon the function of the device in D2D communication, the standard for declaring DLF may be applied differently. For example, in D2D communication, in case the first device corresponds to the transmitting end (i.e., in case the first device performs the function of a transmitter in D2D), and, in case the first device consecutively receives a predetermined number of negative acknowledgements (NACKs), the first device may transmit a DLF to a third device (base station/network or D2D cluster UE). Alternatively, in case the first device fails to consecutively receive a predetermined number of acknowledgements (i.e., ACK/NACK/DTX signals), the first device may declare DLF. In case the first device corresponds to the receiving end (i.e., in case the first device performs the function of a receiver in D2D) in D2D communication, and in case the demodulation performance of the signal, which is received from the second device through the D2D link, is less than or equal to a reference value (a predetermined value), the first device may transmit a DLF to the third device. In other words, control/data channel demodulation performance becomes the reference standard for the DLF, and a detailed determination of the same may be performed, for example, by determining whether or not the SINR, and so on, which is estimated from a D2D link estimation result, is adequate to this reference standard.

As described above, the first user equipment may report/transmit information related to an occurrence or non-occurrence of a DLF, information related to other DLF declaration, when performing DLF declaration. Herein, the reporting of the DLF may also be performed by a second user equipment. In case of a D2D link communication, wherein the first user equipment corresponds to the transmitting end, and wherein the second user equipment corresponds to the receiving end, each of the first user equipment and the second user equipment may perform DLM, and each user equipment may declare a DLF (when the above-described reference standard is met). Information related to DLF declaration may include information on the last successful data transmission prior to the DLF declaration. For example, in case the first device corresponds to the D2D transmitting end, the information related to DLF declaration may include information related to data (e.g., transmission block number, IP packet sequence number, and so on) corresponding to the last acknowledgement (ACK), which is transmitted by the second device. Additionally, in case the second device corresponds to the D2D receiving end, the information related to the DLF declaration may include information on the last data that were successfully demodulated/decoded. In such case, based upon the information included in the DLF, the third device may ensure continuity of data transmission in the subsequent procedures. For example, after the DLF, in case the third device relays the data transmission between the first device and the second device, and in case the second device declares the DLF, and in case the first device continues to transmit data, among the data received from the first device, the third device may transmit data subsequent to the data, which were successfully demodulated by the second device. (Alternatively, after receiving a DLF report from the second device, the third device may send a command to the first device ordering to stop transmission, and, based upon the information related to the DLF declaration, which is reported from the second device, the third device may also send a command to the first device designating from which point transmission is to be performed.

For the above-described DLM and DLF, i) a DLF declaration, ii) a link change request, a resource request, a D2D status report, and so on, may be transmitted to the third device (base station, network, D2D cluster header UE) from the first device/second device. The DLF declaration may be transmitted to the third device by one or more device being connected (or accessing) the third device, a device that is defined beforehand, or a device that is designated to perform DLM during signaling of the network related to D2D. The link change request may correspond to a request to shift to a base station-user equipment link from the D2D link or a request to shift to a cluster UE-user equipment link from the D2D link, and so on, which is made by the device while transmitting the DLF declaration to the third device. The link change request may also be performed by a decision (or determination) made by the network. More specifically, based upon the measurement report result (e.g., D2D link SINR, BLER, receiving power strength (or intensity), and so on), and so on, respective to the D2D link of the first device and the second device, in case the D2D link status is determined to be inadequate for performing communication, the network may transmit a link change command to each device. The resource request may correspond to a request for time/frequency resources that are required by the device, which is transmitting the DLF declaration, for performing additional (or another) discovery. D2D status report refers to a report on information related to the last successfully performed data transmission, which is described above.

Meanwhile, the third device may transmit i) a DLF declaration, ii) starting information for data transmission, and D2eNB initiation or discovery scheduling, and so on, to the first device/second device. The DLF declaration corresponds to a contingency plan for a case when only some of the devices have declared the DLF among the devices performing D2D communication. More specifically, between the first device and the second device, in case only the second device declares the DLF, and in case the first device continues to perform data transmission through the D2D link, this may cause a waste of resources. Therefore, in order to prevent this, when the third device receives the DLF declaration, the third device may signal to other devices connected to the D2D link that the DLF has been declared. In case a link after the DLF (D2eNB, new D2D link, half D2D link via relay UE) resumes the data transmission, the starting information for data transmission signals the starting point of the corresponding data. According to a detailed exemplary embodiment, the last data unit that was successfully transmitted before the DLF may correspond to the starting point of the next data (index), and the unit data may be differently set-up depending upon the layer. After the DLF, the third device may signal to each of the other devices whether or not the D2D link is to be changed (or shifted) to a base station-user equipment (D2eNB) link or whether or not discovery is to be performed. If the discovery performance is being indicated, the required information (e.g., resources for discovery, discovery signal information (e.g., sequence information), and so on) may be signaled.

Figure 7:
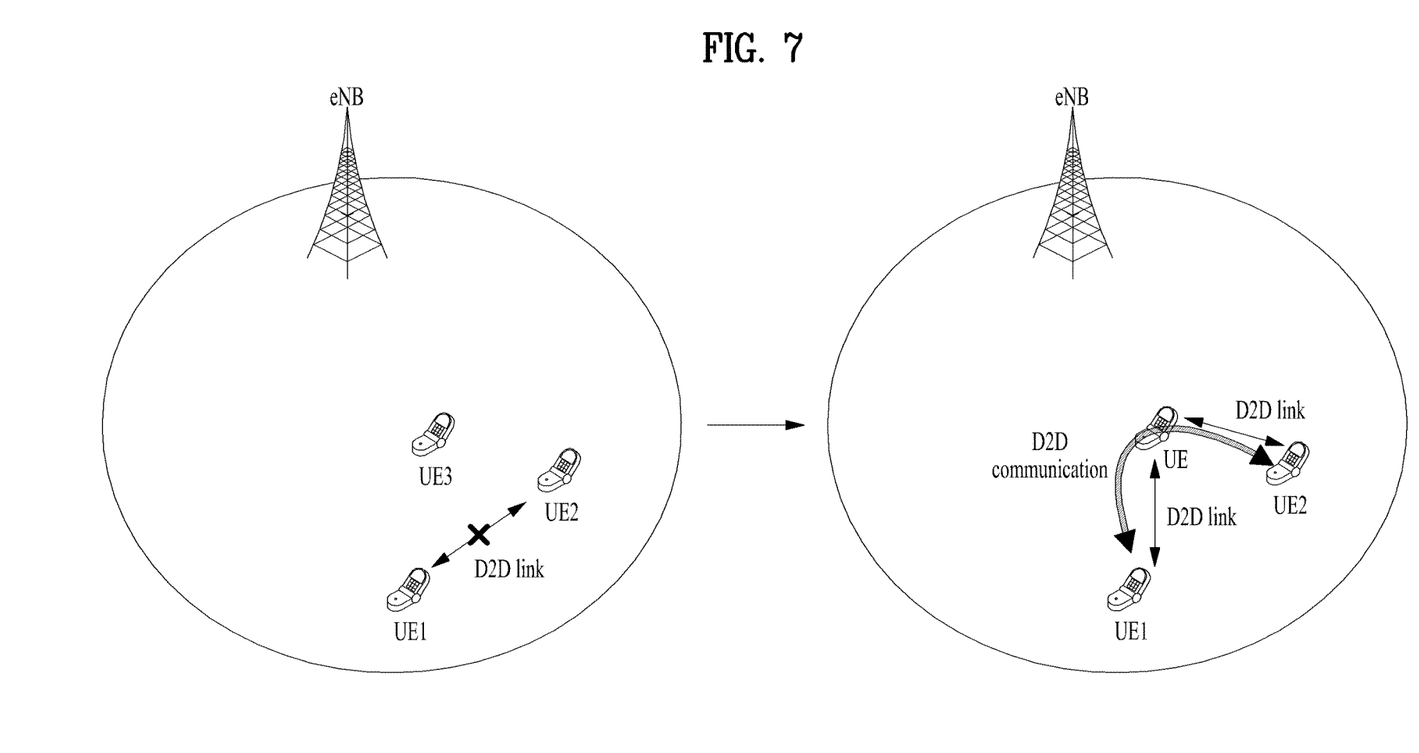
FIG. 7 illustrates a relay for D2D communication according to the exemplary embodiment of the present invention.

The D2D link after DLM and DLF, which is described above, may be shifted (or changed) to a D2eNB link, a half D2D link via re-discovery performance (by a new link) or relay of the D2D device. Among the above, the shift to the half D2D link via relay will hereinafter be described. The concept of the shift to the half D2D link via relay is illustrated as an example in FIG. 7. More specifically, as shown in FIG. 7, in case the D2D link is broken due to the DLF of one or more of the first user equipment (UE1) and the second user equipment (UE 2), which were performing communication via the D2D link, D2D communication via relay of a fourth user equipment (UE 4) may be performed. This will hereinafter be described in more detail.

D2D Communication Via Relay

Figure 8:
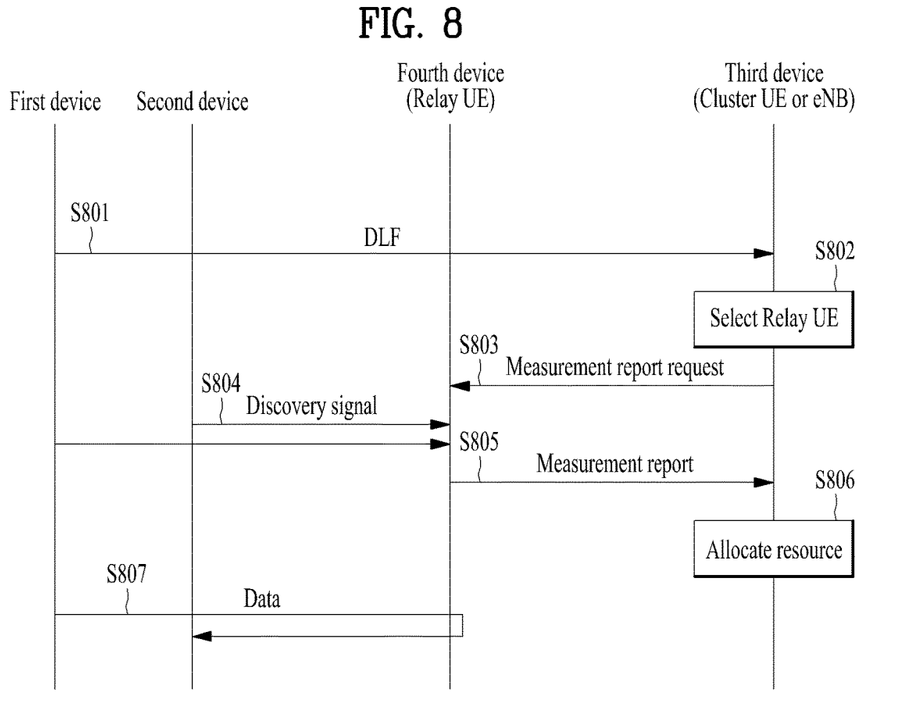
FIG. 8 illustrates a flow chart for measurement, link failure declaration, and relay according to the exemplary embodiment of the present invention.

In case a DLF is declared (S801), based upon a measurement report of a D2D device, the third device may determine (or decide) a device (fourth device) that is to perform relay (S802).

In some cases, the fourth device, which is decided (or determined) as the relay, may not be capable of easily performing relay operations due to reasons of performing another operation or battery consumption, and so on, and, for this, the third device may transmit a D2D relay request message before notifying the selected fourth device to the first and second devices. This is to allow the fourth device to report whether or not it will be performing relay operations, and, in case the fourth device is capable of performing the relay operations, the fourth device may transmit the respective response.

The third device may transmit a Measurement report request to the fourth device, which is selected as the relay (S803). This request allows the fourth device to report a measurement result on a discovery signal of the corresponding D2D pair (S804). The third device may notify information on a discovery signal, which is transmitted by the D2D pair, to the fourth device along with the request. As a detailed example, this information may include information required for allowing the fourth device to receive the discovery signal, such as signal transmitted time/frequency resource information, sequence information of the discovery signal, and so on. After performing measurement by using the received discovery signal based upon such information, the fourth device may transmit a measurement result (RSRP, RSRQ, signal quality information, such as SINR, and so on) of the discovery signal of the D2D device and/or a measurement report including information as to whether or not the fourth device can perform relay operations to the third device. (S805)

After selecting the fourth device, the third device may allocate resources for the relay. (S806) More specifically, the third device may allocate time/frequency resources for D2D communication to the relay device and D2D pair. At this point, by signaling the D2D status information (e.g., data information that the corresponding D2D pair has successfully transmitted and received before the occurrence of the DLF), which is proposed above, to the fourth device and/or the D2D pair, D2D communication may be performed without any waste in resource.

By using the resource, which is allocated by the third device, the first device may perform communication with the second device through the fourth device. For example, in case the first device corresponds to the transmitting end, as shown in FIG. 8, the first device may transmit that are intended to be transmitted to the second device to the fourth device, and, then, the fourth device may transmit this data to the second device. (S807)

In order to reduce the load of the fourth device performing the relay functions, the first device and the second device may perform measurement on the discovery signal, which is being transmitted between devices of the D2D pair or from neighboring devices, even in the time period (or section) during which communication is performed via the relaying of the fourth device. Based upon this measurement, a handover respective to the relay device or a shift to a communication between the D2D pair, and so on, may be performed. For example, the first device, which is transmitting data to the second device through the relay of the fourth device, may transmit a message for a handover request to a device (D2D capable device, relay device, and so on), which is determined to have a better link quality based upon the measurement result, to the third device. After receiving this message, the third device may decide (or determine) whether or not to perform the handover based upon the measurement reported situation. Alternatively, in case the link quality with the second device is recovered back to the level prior to the DLF, a shift from the communication via relay to D2D communication with the second device may be performed.

Figure 9:
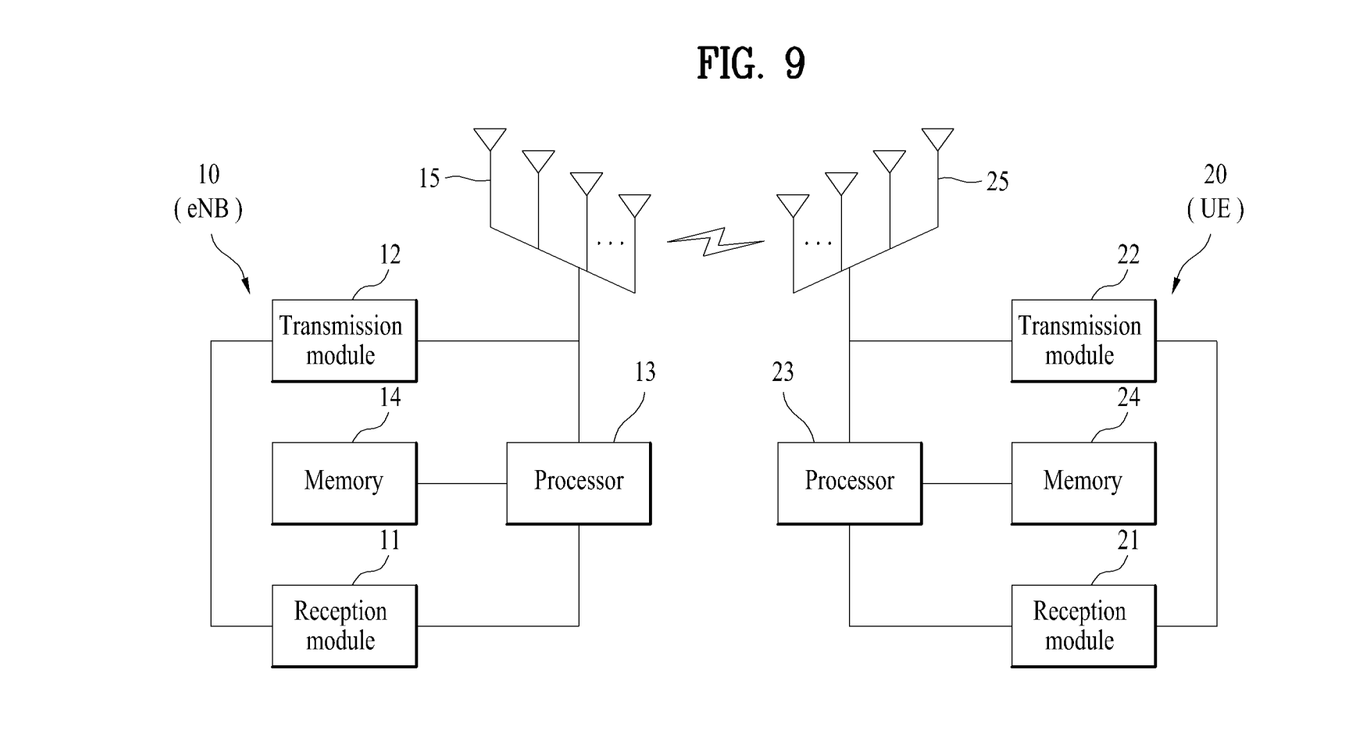
FIG. 9 illustrates the structure of a transceiving device.

Device Configuration According to the Exemplary Embodiment of the Present Invention FIG. 9 illustrates configurations of a transmission point device and a user equipment device according to an exemplary embodiment of the present invention.

Referring to FIG. 9, the transmission point device (10) according to the present invention may include a reception module (11), a transmission module (12), a processor (13), a memory (14), and multiple antennae (15). The multiple antennae (15) indicate that the transmission point device supports MIMO transmission/reception (or transception). The reception module (11) may receive diverse signals, data, and information within an uplink from the user equipment. The transmission module (12) may transmit diverse signals, data, and information within a downlink to the user equipment. The processor (13) may control the overall operations of the transmission point device (10).

The processor (13) of the transmission point device (10) according to an exemplary embodiment of the present invention may process the details that are required in each of the exemplary embodiments, which are described above.

Moreover, in addition to the above-described functions, the processor (13) of the transmission point device (10) may perform functions of performing calculation operations of information received by the transmission point device (10), information that is to be transmitted to an external target, and so on. And, the memory (14) may store the calculated information for a predetermined period of time, and the memory (14) may also be replaced with another element, such as a buffer (not shown).

Additionally, referring to FIG. 9, the user equipment device (20) according to the present invention may include a reception module (21), a transmission module (22), a processor (23), a memory (24), and multiple antennae (25). The multiple antennae (25) indicate that the user equipment device supports MIMO transmission/reception (or transception). The reception module (21) may receive diverse signals, data, and information within a downlink from the base station. The transmission module (22) may transmit diverse signals, data, and information within an uplink to the base station. The processor (23) may control the overall operations of the user equipment device (20).

The processor (23) of the user equipment device (20) according to an exemplary embodiment of the present invention may process the details that are required in each of the exemplary embodiments, which are described above.

In addition to the above-described functions, the processor (23) of the user equipment device (20) may perform functions of performing calculation operations of information received by the user equipment device (20), information that is to be transmitted to an external target, and so on. And, the memory (24) may store the calculated information for a predetermined period of time, and the memory (24) may also be replaced with another element, such as a buffer (not shown).

The detailed structure of the transmission point device and the user equipment device, as described above, may be implemented by independently applying the detailed described in diverse exemplary embodiments of the present invention or may be implemented by simultaneously applying 2 or more exemplary embodiments of the present invention. And, for clarity in the description, overlapping contents will be omitted.

Additionally, in the description on FIG. 9, the description on the transmission point device (10) may also be equally applied to a relay device operating as a downlink transmitting subject or an uplink receiving subject, and the description on the user equipment device (20) may also be equally applied to a relay device operating as a downlink receiving subject or an uplink transmitting subject.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described exemplary embodiments according to the present invention may be applied to diverse mobile communication systems.

What is claimed is:

1. A method for performing device-to-device (D2D) communication, by a first device, in a wireless communication system, the method comprising:
   receiving a discovery signal from one or more D2D devices while performing the D2D communication with a second device;
   transmitting a report on the received discovery signal to a base station;
   performing D2D link monitoring (DLM);
   transmitting a D2D link failure (DLF) declaration to the base station, when the DLM result meets a predetermined condition; and
   performing communication with the second device via a relay device determined by the base station based on the report and a response to a relaying request.

2. The method of claim 1, wherein, in case the first device corresponds to a transmitting end of the D2D link, the predetermined condition corresponds to one of consecutively receiving a predetermined number of negative acknowledgements (NACKs) and failing to consecutively receive a predetermined number of acknowledgements (ACKs).

3. The method of claim 2, wherein performing communication with the second device through the relay device comprises:
   transmitting a signal that is to be transmitted to the second device to the relay device through a resource allocated by the base station; and
   measuring a discovery signal from one or more D2D devices while performing the D2D communication with the relay device.

4. The method of claim 1, wherein, in case the first device corresponds to a receiving end of the D2D link, the predetermined condition corresponds to a demodulation performance of the signal received through the D2D link being lower than a predetermined value.

5. The method of claim 2, wherein the DLF includes information related to data corresponding to a last acknowledgement (ACK) transmitted by the second device.

6. The method of claim 5, wherein the information related to data corresponding to a last acknowledgement (ACK) transmitted by the second device includes one or more of a transmission block number and an internet protocol packet sequence number.

7. The method of claim 3, further comprising:
   transmitting a handover request message to the base station based on the measured discovery signal while performing the D2D communication with the relay device.

8. A method for supporting device-to-device (D2D) communication, by a base station, in a wireless communication system, the method comprising:
   receiving, from a first device, a report on a discovery signal received by a first device from one or more D2D devices while performing the D2D communication with a second device;
   receiving a D2D Link Failure (DLF) declaration from the first device; and determining a relay device that is to relay communication between the first device and a second device based on the received report and a response to a relaying request, wherein the DLF declaration is transmitted when a D2D Link Monitoring (DLM) result of the first device meets a predetermined condition.

9. The method of claim 8, wherein, in case the first device corresponds to a transmitting end of the D2D link, the predetermined condition corresponds to one of consecutively receiving a predetermined number of negative acknowledgements (NACKs) and failing to consecutively receive a predetermined number of acknowledgements (ACKs).

10. The method of claim 9, further comprising:
having the first device allocate resources that is to be used when transmitting a signal to the second device through the relay device.

11. The method of claim 8, wherein, in case the first device corresponds to a receiving end of the D2D link, the predetermined condition corresponds to a demodulation performance of the signal received through the D2D link being lower than a predetermined value.

12. The method of claim 9, wherein the DLF includes information related to data corresponding to a last acknowledgement (ACK) transmitted by the second device.

13. The method of claim 12, wherein the information related to data corresponding to a last acknowledgement (ACK) transmitted by the second device includes one or more of a transmission block number and an internet protocol packet sequence number.

14. The method of claim 8, further comprising:
receiving a handover request message from the first device based on a discovery signal measured by the first device while performing the D2D communication with the relay device.

* * * * *